Patented May 12, 1953

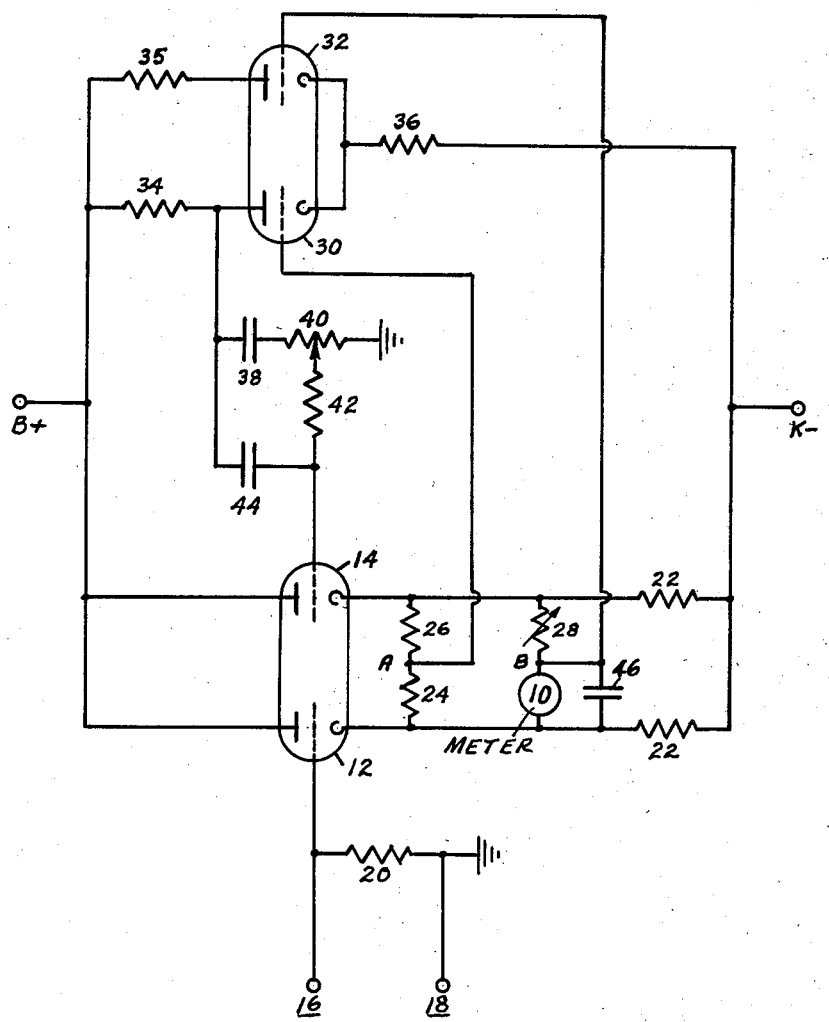

2,638,492

UNITED STATES PATENT OFFICE 2,638,492

INERTIA CONTROL AND DAMPING MEANS FOR GALVANOMETERS

Otto H. Schmitt, Port Washington, N. Y., assignor to the United States of America as represented by the Secretary of the Navy Application May 11, 1944, Serial No. 535,162

6 Claims. (Cl. 171—95)

This invention relates to galvanometers and more particularly to methods of and means for improving the transient response of a galvanometer.

In certain applications of galvanometers and particularly in recording meters, it is frequently desirable to increase the frequency range over which the response of a particular galvanometer varies linearly with the input signal applied thereto. In some cases, such improvement involves speeding up the action of the galvanometer suspension. Conveniently, the speed of the galvanometer action may be increased by reducing simultaneously the moment of inertia of the suspension thereof, and reducing the damping forces acting on that suspension. In other cases, it may be desirable to increase the moment of inertia and simultaneously to increase the damping forces. In either case, in order to obtain optimum performance, the condition of nearly critical damping is preferably maintained.

One method for so improving the transient response of a galvanometer is disclosed in my paper entitled "Electrical Control of Galvanometer Characteristics" which appeared in the Journal of Scientific Instruments, vol. XV, No. 7, July 1938. As disclosed in that paper, the characteristics of a moving-coil galvanometer may be altered by the application of E. M. F.'s of adjustable polarity and proportional respectively to the angular displacement, the angular velocity and the angular acceleration of the moving coil, these E. M. F.'s varying respectively with the apparent stiffness of the galvanometer movement, the effective damping forces, and the apparent moment of inertia of the movement. For this purpose, the use of a photoelectric cell for the generation of the proportional E. M. F.'s was suggested, the amount of light from an external projector falling on the cell being varied by means of a mirror moving with the galvanometer coil. Differentiating circuits were used to develop, from the E. M. F. proportional to displacement, E. M. F.'s proportional to angular velocity and angular acceleration.

An object of the present invention is to provide an improved system for varying the frequency response of a galvanometer in which the use of photoelectric cells is not required, thereby to avoid inaccuracies due to misadjustments and to reduce susceptibility of the system to mechanical vibrations and variations in the intensity of the light beam formerly used therein.

In view of this object, my invention provides in one aspect a method of improving the transient response of a moving-coil galvanometer which includes amplifying the back E. M. F. appearing across the moving coil thereof, applying a portion of the amplified back E. M. F. to the galvanometer in proper phase to alter the electrical damping thereof, simultaneously taking the time derivative of the amplified back E. M. F., and applying the derivative to the galvanometer in proper phase effectively to alter the moment of inertia of the moving coil thereof.

In another aspect, my invention provides in combination with a moving-coil galvanometer, means for amplifying the back E. M. F. generated in the moving coil thereof, means for differentiating the amplified back E. M. F., and means simultaneously to apply to the galvanometer chosen portions of the amplifier back E. M. F. and the differentiated E. M. F.

The above and other features of the invention will be described in the following detailed specification and will be pointed out in the appended claims.

In the drawing, the single figure is a circuit diagram showing means adapted to practice the method of my invention.

As shown in the drawing a moving-coil galvanometer 10, the transient response of which is to be improved, is connected in a bridge circuit between the cathodes of a pair of vacuum tubes 12 and 14. These vacuum tubes are arranged to operate as Class A amplifiers and one of them serves to drive the galvanometer in response to input signals applied to terminals 16 and 18. Accordingly, terminal 16 is connected to the grid of vacuum tube 12, while terminal 18 is connected to ground. The input signal then appears across grid resistor 20, connected between the two input terminals. The control function of vacuum tube 14 will be described below, but it is pointed out here that its grid also is provided with a direct-current connection to ground. The plates of vacuum tubes 12 and 14 are connected to a source of positive potential indicated at B+, while the cathodes are connected through bias resistors 22 to a source of negative potential indicated at K—, both D.-C. potentials being connected to ground at their opposite terminals as is conventional, the potential sources incorporating the customary by-pass capacity to ground.

The galvanometer bridge connected between the cathodes of vacuum tubes 12 and 14 comprises matched resistors 24 and 26, galvanometer 10 and variable resistor 28, the galvanometer replacing one of the elements of the conventional Wheatstone bridge circuit. The output of the bridge appears across terminals A and B, which are connected respectively to the grids of vacuum tubes 30 and 32, these tubes being connected in a cathode phase inversion circuit of the type disclosed in my paper entitled "Cathode Phase Inversion" which appeared in the Journal of Scientific Instruments, vol. XV, No. 3, March 1938. The plates of vacuum tubes 30 and 32 are thus connected through plate resistors 34 and 35 to the source of positive potential indicated at B+, while the cathodes are connected through a common cathode resistor 36 to the source of negative potential indicated at K—.

Considering the operation of the portions of the circuit thus far described, it will be seen that that under static conditions, that is, no-signal conditions, a steady plate current flows through each of vacuum tubes 12 and 14. If these tubes are exactly matched, no voltage appears across the input diagonal of the bridge circuit between their cathodes. If, as is more usual, the plate currents in these two vacuum tubes are unequal, a voltage is applied across the input diagonal of the bridge and a voltage will appear across the output diagonal thereof unless the bridge itself is in balance. To prevent such output from the bridge under no-signal conditions, variable resistor 28 is adjusted until the bridge circuit becomes statically balanced.

Under no-signal conditions this bridge balance is attained simply by making resistor 28 equal to the galvanometer resistance, as determined by preliminary measurement of the components or by test for a null reading between points A and B of the bridge in the usual manner. Galvanometer 10, constituting one arm of the bridge, is not used for this null test. The purpose of balancing the bridge is to make the input to the driven phase-inversion amplifier substantially proportional to the angular velocity of the galvanometer coil, and independent of the drive applied to the galvanometer. Zero initial reading of galvanometer 10 is attained either by adjusting the value of resistors 22 for zero voltage across the bridge or, more practically, by adjusting the galvanometer suspension or scale to zero even when carrying constant current due to a steady state input voltage to the bridge.

If now, a signal, which for simplicity of illustration may be assumed to be a positive pulse, is applied between input terminals 16 and 18, the plate current through vacuum tube 12 is increased causing current to flow from the cathode of vacuum tube 12 to that of vacuum tube 14, through the two branches of the bridge circuit. This current causes an angular displacement of the coil of galvanometer 10 which is proportional to the input signal. Such displacement is accompanied by the generation in the galvanometer coil of a back E. M. F. proportional to the angular velocity of the coil. This back E. M. F. causes a potential difference to appear between bridge output terminals A and B which in turn is applied between the grids of vacuum tubes 30 and 32.

Now, and as pointed out in my paper relating to cathode phase inversion referred to above, a signal applied to the control grid of either of vacuum tubes 30 and 32 appears almost symmetrically amplified but in opposite phase across the two plate resistors 34 and 35. Thus it will be seen that there is available in the plate circuits of vacuum tubes 30 and 32 a voltage proportional to the angular velocity of the moving coil of galvanometer 10, and further that this voltage is available for application to the galvanometer coil either in phase with the back E. M. F. generated in that coil, or in phase opposition therewith. If this voltage is applied to the meter in phase opposition, it will, as pointed out in my paper relating to electrical control of galvanometer characteristics referred to above, act effectively to reduce the electrical damping of the galvanometer due to its back E. M. F.. If, in addition, this voltage is differentiated in respect to time and then applied to the galvanometer, it will act to reduce the apparent moment of inertia of the moving coil.

Since optimum galvanometer response usually occurs when the damping of the galvanometer is nearly critical, such damping is preferably maintained when the moment of inertia of the moving coil is altered to improve the transient response. It is necessary, therefore, simultaneously to alter the apparent moment of inertia and the effective damping.

For the purpose of utilizing the voltages appearing in the plate circuits of vacuum tubes 30 and 32 to produce the desired changes in galvanometer characteristics, the following circuits are provided. The voltage appearing across plate resistor 34 is applied through coupling capacitor 38, potentiometer 40 and series resistor 42 to the grid of vacuum tube 14, one end of potentiometer 40 being connected to ground to complete the grid circuit of that tube. Adjustment of the setting of potentiometer 40 serves to vary the effective reduction in electrical damping of the galvanometer.

The voltage appearing across resistor 34 is simultaneously applied through differentiating capacitor 44 to the grid of vacuum tube 14, the value of capacitor 44 determining the effective reduction of the apparent moment of inertia of the coil.

Conveniently, capacitor 46 is connected across the terminals of galvanometer 10 to prevent high-frequency oscillations which otherwise may tend to build up in the circuit including the galvanometer coil.

In one successful embodiment of the invention, the following constants were used: Vacuum tubes 12 and 14 each comprised one half of a type 6SN7 tube while vacuum tubes 30 and 32 each comprised one half of a type 6SL7 tube. The potential at B+ was +180 volts while that at K— was —45 volts. Circuit components had the following values:

| | | |
|---|---|---|
| Resistor 20 | megohms | 0.5 |
| Resistors 22 | ohms | 15,000 |
| Resistors 24 and 26 | do | 5,000 |
| Variable resistor 28 | do | 2,000 |
| Resistors 34 and 35 | megohms | 0.1 |
| Resistor 36 | ohms | 30,000 |
| Potentiometer 40 | megohms | 1.0 |
| Resistor 42 | do | 0.2 |
| Capacitor 38 | microfarads | 10 |
| Capacitor 44 | do | 0.03 |
| Capacitor 46 | do | 0.108 |

Using the circuit constants given above, the action of a particular galvanometer-type recorder was speeded up by a factor of five without decrease in sensitivity. Thus, the response was linear over an input frequency range five times as broad as that which previously provided the same linearity.

It will be understood that the above circuit constants are given by way of illustration only, since the required values vary between wide limits depending upon the particular galvanometer used. Furthermore, under certain conditions, the value of capacitor 38 may be so chosen that it simultaneously serves as coupling capacitor in the circuit controlling damping and as differentiating capacitor in the controlling moment of inertia. In this case, capacitor 44 and its connecting leads are omitted.

Having thus described my invention, what I claim as new and desire to secure by Letters Patent of the United States is:

1. The method of improving the transient response of a moving-coil galvanometer which includes locating the galvanometer in one arm of a bridge circuit, amplifying the back E. M. F. appearing across the moving coil thereof, applying a portion of the amplified back E. M. F. to the galvanometer to alter the electrical damping thereof, simultaneously taking the time derivative of said amplified back E. M. F., and applying said derivative to the galvanometer effectively to alter the moment of inertia of the moving coil thereof.

2. In combination with a moving-coil galvanometer, means for applying signals to the moving coil, means for amplifying the back E. M. F. generated in the moving coil, means for differentiating the amplified back E. M. F., and means simultaneously to apply to the galvanometer chosen portions of said amplified back E. M. F. and said differentiated E. M. F.

3 The method of improving the transient response of a moving-coil galvanometer wherein the back electromotive force of the moving coil is amplified and used, comprising locating the galvanometer in one arm of a bridge circuit, amplifying the back electromotive force appearing across the moving coil, applying a portion of the amplified back electromotive force to the galvanometer to alter the electrical damping, simultaneously taking the time derivative of another portion of the amplified back electromotive force, and applying the derivative to the galvanometer to alter the moment of inertia of the moving coil of the galvanometer.

4. The method of improving the transient response of a moving-coil galvanometer wherein the back electromotive force of the moving coil is amplified and used, comprising locating the galvanometer in one arm of a bridge circuit, applying a signal to said bridge whereby the motion of the coil is proportional to the signal, amplifying the back electromotive force appearing across the moving coil, applying the amplified back electromotive force to the bridge to alter the electrical damping of the galvanometer, simultaneously taking the time derivative of the amplified back electromotive force, and applying the derivative to the bridge to alter the effective moment of inertia of the moving coil of the galvanometer.

5. A system for measuring relatively small electric voltages produced by a source of signals, comprising a moving-coil galvanometer, means for amplifying the signals from said source and applying them to an electrical bridge of which the moving coil of said galvanometer constitutes one arm, the movement of said coil being proportional to the signals applied to the bridge, means for balancing said bridge in the absence of signals, means for amplifying the back electromotive force appearing across said moving coil, means for applying the amplified back electromotive force to said bridge to alter the electrical damping of said galvanometer, means simultaneously taking the time derivative of said amplified back electromotive force, and means for applying said derivative to said bridge to alter the effective moment of inertia of the moving coil.

6. Apparatus for improving the transient response of a system for measuring relatively small electric voltages produced by a source of signals, said system including a moving-coil galvanometer, comprising an amplifier for amplifying the signals from said source, an electrical bridge network of which the moving coil of said galvanometer constitutes one arm and a variable resistor for balancing the bridge constitutes another, means for applying a signal to said bridge whereby the movement of said coil is proportional to the signals applied, a phase-reversing amplifier for amplifying the back electromotive force appearing across said moving coil in the presence of a signal, a resistance-capacitance network for selecting a desired portion and for taking the time derivative of said amplified back electromotive force in such manner as to provide two voltages adapted respectively to alter the electrical damping of said galvanometer and to alter the effective moment of inertia of its moving coil, and an amplifier for amplifying said two voltages and applying them to the moving coil of said galvanometer.

OTTO H. SCHMITT.

References Cited in the file of this patent

UNITED STATES PATENTS

| Number | Name | Date |
|---|---|---|
| 1,535,538 | Maxfield et al. | Apr. 28, 1925 |
| 1,822,758 | Toulon | Sept. 8, 1931 |
| 2,351,079 | Strobel | June 13, 1944 |
| 2,351,353 | McCarty | June 13, 1944 |
| 2,356,617 | Rich | Aug. 22, 1944 |